Figure 1:
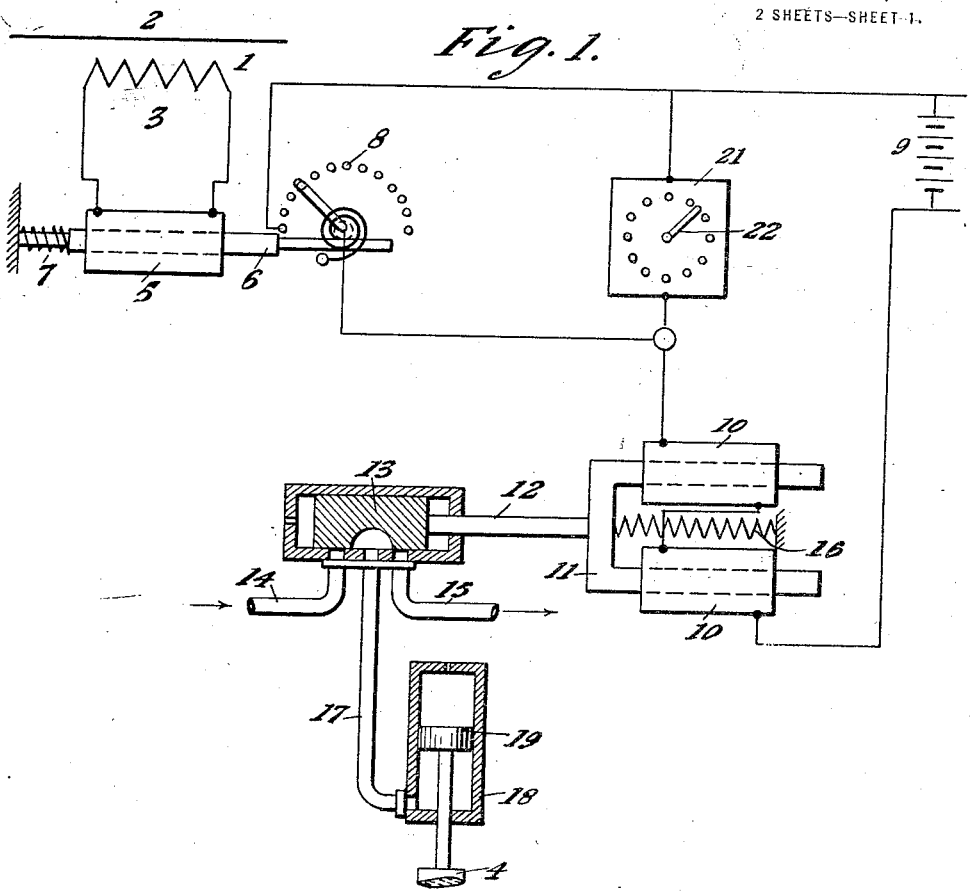

C. C. GOW AND D. F. CAMPBELL.
CONTROL OF POWER ABSORBED IN ELECTRIC FURNACES.
APPLICATION FILED APR. 24, 1919.

1,327,548.

Patented Jan. 6, 1920.

2 SHEETS—SHEET 1.

C. C. GOW AND D. F. CAMPBELL.
CONTROL OF POWER ABSORBED IN ELECTRIC FURNACES.
APPLICATION FILED APR. 24, 1919.
1,327,548.
Patented Jan. 6, 1920.
2 SHEETS—SHEET 2.
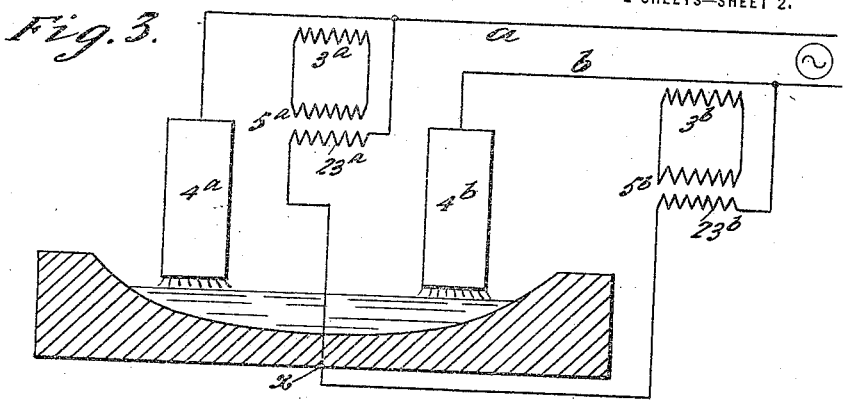
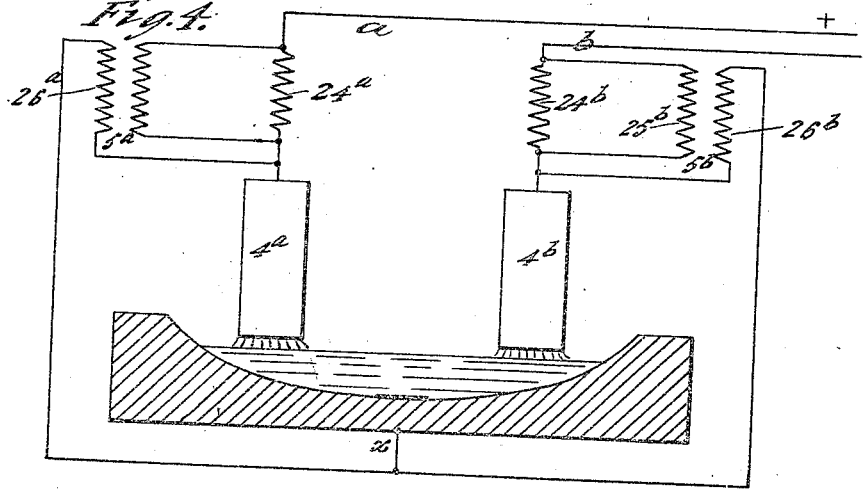
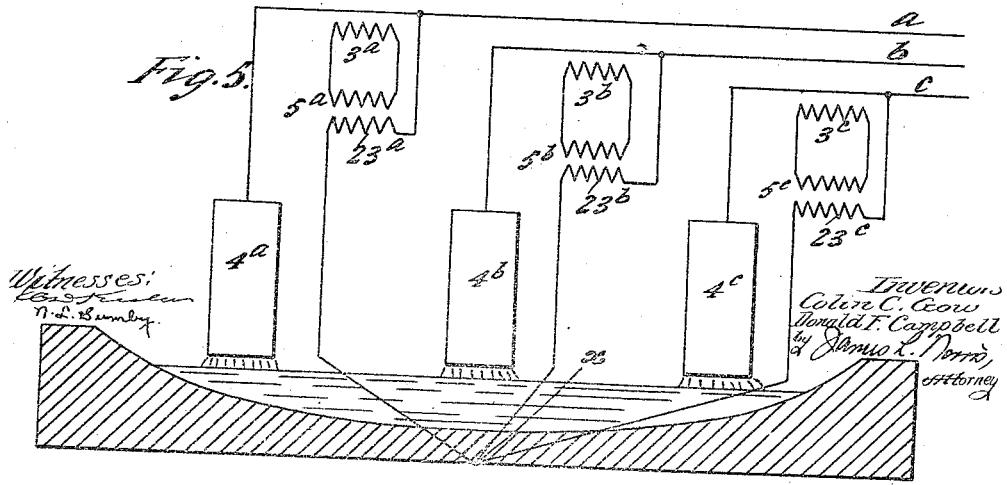

UNITED STATES PATENT OFFICE.

COLIN CLARENCE GOW AND DONALD FRASER CAMPBELL, OF LONDON, ENGLAND.

CONTROL OF POWER ABSORBED IN ELECTRIC FURNACES.

1,327,548.

Specification of Letters Patent.    Patented Jan. 6, 1920.

Application filed April 24, 1919. Serial No. 292,438.

*To all whom it may concern:*

Be it known that we, COLIN CLARENCE GOW and DONALD FRASER CAMPBELL, both subjects of the King of Great Britain, residing in London, England, have jointly invented certain new and useful Improvements Relating to the Control of Power Absorbed in Electric Furnaces, of which the following is a specification.

This invention relates to the control of power supplied to electric furnaces in which the power absorbed is entirely or in part dependent upon the position of movable conductors hereinafter called electrodes.

It is known to maintain the power supplied to furnaces of this type at any predetermined value by gearing, operated electrically or by hand, which actuates the electrodes in the direction either to increase or diminish the resistance to the passage of the electric current. The gearing, when electrically operated, is actuated by reversible motors which are connected either by hand or by automatically controlled apparatus with an independent source of electric supply.

The motors if automatically controlled are usually energized intermittently, and impart corresponding movements to the electrodes until the required adjustment has been made.

If a considerable movement is necessary before the normal conditions are obtained, the installation may be working for some appreciable time under unfavorable conditions and, on the other hand, if the fluctuations to be controlled are of small extent, the correction applied may be in excess of the requirements and oscillating movements causing "hunting" of the regulating apparatus may easily take place.

It is obvious that a better regulation would be afforded by a continuous movement of the electrode in the required direction, more especially if the speed of the movement varied according to the extent of the adjustment required.

For this purpose it has been previously proposed to move the electrode by means of a supply of pressure fluid controlled by a valve operated by an electromagnetic device energized by a current obtained from a current transformer in the load circuit, or shunted from that circuit, a variable resistance in the latter case being inserted in order to obtain a hand regulation. The present invention relates to this type of apparatus and consists in improvements by which the fluid pressure supply is controlled by an independent source of electricity, the current strength of which is varied in correspondence with the load.

Also means are provided by which the predetermined load can be varied within wide limits. It is usually necessary, during some phase of an electric furnace process, more especially in the manufacture of steel, to maintain the current at one fourth or even less of its full load value and to effect the automatic regulation with small limits, for example, of about 5 per cent. If the furnace is supplied with alternating currents, in order to obtain the necessary power for operating the solenoid or other device which controls by means of the variable resistance, the strength of the current in the independent circuit, it is convenient to provide tappings from the secondary circuit of the current transformer, so that the strength of the secondary circuit is approximately constant for different values of the primary current. A current transformer is provided in the circuit of a single phase system or in each phase of a polyphase system.

In electric furnaces in which the current passes in series through two or more electrodes, or in polyphase alternating circuits, in order that the voltage should be divided equally between the electrodes, the electromagnetic devices controlling the current from the independent source are energized by a winding of which the current depends on the voltage between the electrodes and the charge as well as by a winding of which the current depends upon the load.

A rectifier may be introduced to rectify the current in the windings in the solenoid controlling the variable resistance. If the furnace power supply is from a direct current source the solenoid controlling the variable resistance may be energized by a winding connected across the terminals of a low resistance inserted in the main leads.

The accompanying drawings show diagrammatically, by way of example, circuit arrangements according to the invention.

In the arrangement shown in Figure 1, a solenoid is energized by a current transformer inserted in the load circuit and automatically controls the movable electrode by regulating the strength of the current from a source of direct current. This current through an electromagnetic device determines the position of a valve admitting fluid pressure to or releasing it from a cylinder in which a piston connected with the movable electrode reciprocates.

Figure 2:
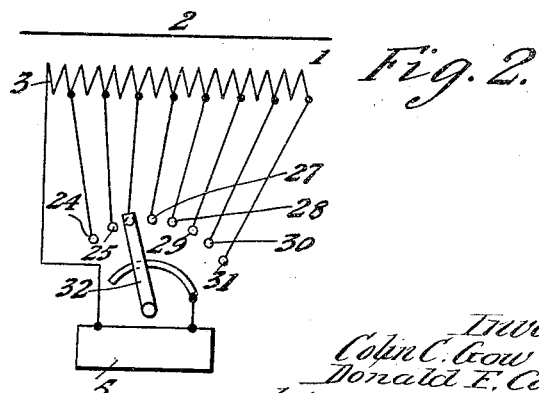

Fig. 2 shows tappings connected with the secondary circuit of the current transformer; Fig. 3 shows a modification of the windings of the solenoid adapted for alternating current circuits in which two electrodes are arranged in series; Fig. 4 shows a similar modification suitable for a direct current load circuit; Fig. 5 shows a similar modification adapted for a three phase alternating current circuit.

The circuits shown in Figs. 3, 4 and 5 are given as examples and may be suitably modified for other arrangements of the electrodes.

Referring to Fig. 1, 1 is a current transformer, preferably of the shell type, the primary winding 2 being traversed by the whole or a constant proportion of the main current supplied to the movable electrode 4. The secondary winding 3 of the transformer energizes an electromagnetic device, shown in the example as a solenoid 5 of which the plunger 6 is drawn to the left against the action of a spring 7 in dependence on the strength of the current.

The plunger 6 controls by a resistance 8 the current strength in a circuit energized from an independent source of preferably direct current, represented in the example shown by a battery 9. This circuit includes a solenoid 10 the plunger 11 of which is connected with the stem 12 of a valve 13, which in its normal position closes both an inlet 14 to a supply of fluid pressure, such as oil, water or compressed air, and also a discharge outlet 15. If the current in the transformer 1 rises above the predetermined value, the plunger 6 of solenoid 5 is moved to the left and thereby increases the resistance 8, the solenoid 10 is less strongly energized and the valve 13 is moved to the left by a spring 16 to open the inlet 14 and supply fluid pressure through a pipe 17 to a cylinder 18 and thereby raise a piston 19 and with it the movable electrode 4.

If, on the other hand, the current in the circuit of the transformer 1, 2 falls below the predetermined value, the resistance 8 is lessened and the valve 13 is moved by the plunger 11 to the right, the inlet 14 remains closed and the fluid in the cylinder 18 is exhausted through the outlet 15, the piston 19 descending by the weight of the electrode, or the action of a spring or other suitable force.

A variable resistance 21 is connected in parallel with the automatically adjusted resistance 8, and is set by hand to a value which causes the operation of the valve 13 to occur at the required value of the current in the primary winding 2 of the transformer 1.

By suitably proportioning the resistance 21, when the control arm 22 is set in either of its extreme positions the current in the circuit of the solenoid 10, and consequently the movement of the electrode 4, may be manually controlled in the required direction independently of the current in the transformer 3.

The resistance 8 might be connected in series instead of in parallel with the resistance 21.

It is not necessary that the plunger 11 of the solenoid 10 should be directly connected with the spindle 12 of the valve 13; the movement of the plunger in either direction may be adapted to complete the circuit of a relay which effects the required operation of the valve and in this case is automatically brought into the normal position under spring control.

For the purpose of adjusting within wide limits the predetermined value at which the load is to be maintained, tappings are connected with the secondary winding of the transformer 3 and led in the usual manner to contact studs 24—31 wiped by an arm 32 which conveys current to one terminal of the solenoid 5. In this case the resistance 21 is only required for the hand control of the electrodes.

Although it has been assumed that a single valve may be used to control the supply of fluid pressure, it is obvious that a combination of valves may be used for this purpose.

In the arrangement shown in Fig. 3 in which the electrodes $4^a$ and $4^b$ are connected in series over the leads $a$ and $b$ of a single phase alternating circuit, the solenoid $5^a$ is energized by a winding in series with the secondary circuit $3^a$ of the current transformer as in Fig. 1, and also by a winding $23^a$ connected with the lead $a$ and a point $x$ in the conducting hearth.

Similarly, a solenoid $5^b$ is energized by a winding connected with the secondary winding $3^b$ of the current transformer and a winding $23^b$ connected with the lead $b$ and the point $x$.

This arrangement insures that an equal amount of power is absorbed between each electrode and the point $x$ and that the total power supplied is automatically maintained at the predetermined value.

In the arrangement shown in Fig. 4, the electrodes $4^a$ and $4^b$ are connected in series with a source of direct current over the leads $a$, $b$. The solenoid $5^a$ is energized by a winding $25^a$ in shunt with the resistance $24^a$ and also by a winding $26^a$ connected between the terminal of the electrode 4ª and the point *x*. The solenoid 5ᵇ is similarly energized by windings 25ᵇ and 26ᵇ.

In Fig. 5 the electrodes 4ª, 4ᵇ, 4ᶜ are connected respectively with the leads *a*, *b*, *c* of a three-phase circuit and the solenoids 5ª, 5ᵇ, 5ᶜ are energized by the resultant action of the windings connected with the current transformers 3ª, 3ᵇ, 3ᶜ, and the windings 23ª, 23ᵇ, 23ᶜ connected respectively with the leads *a*, *b*, *c* and with the common junction *x*.

In an installation provided with a supply at constant current each electrode would be automatically controlled in dependence on the voltage at the terminals of the electrode.

Having thus described the nature of the said invention and the best means we know of carrying the same into practical effect, we claim:—

1. Means for maintaining the power absorbed in an electric furnace at a predetermined value, comprising a supply of fluid pressure controlled by an electromagnetic device energized by current from a source independent of the load circuit, the strength of the said current being regulated by means of variable resistances automatically adjusted according to the power supplied to the load circuit.

2. In control apparatus according to claim 1, means for automatically adjusting the variable resistances comprising a solenoid or other equivalent device energized by the secondary winding of a transformer of which the primary winding is traversed by the current, or by a portion of the current, supplied to the electrodes of the furnace.

3. In control apparatus according to claim 1, means for automatically adjusting the variable resistances, comprising a solenoid or other equivalent device connected in parallel across a low resistance traversed by the load current supplied to the electrodes of the furnace.

4. In parallel with the automatically adjusted variable resistances referred to in claim 1, other resistances adapted to be operated manually in order to adjust the predetermined value of the current maintained in the movable electrode.

5. For the purpose of adjusting the predetermined value of the power supplied to the electric furnace, tappings taken from the secondary windings of the current transformer to the solenoid claimed in claim 2.

6. Control apparatus according to claim 2, in which the solenoid or other equivalent device therein claimed is provided with an additional winding energized by a current dependent upon the voltage between the electrode and the charge.

In testimony whereof we have signed our names to this specification.

COLIN CLARENCE GOW.
DONALD FRASER CAMPBELL.